J. K. PARK.
TROLLEY HARP.
APPLICATION FILED AUG. 16, 1915.
1,185,130.
Patented May 30, 1916.
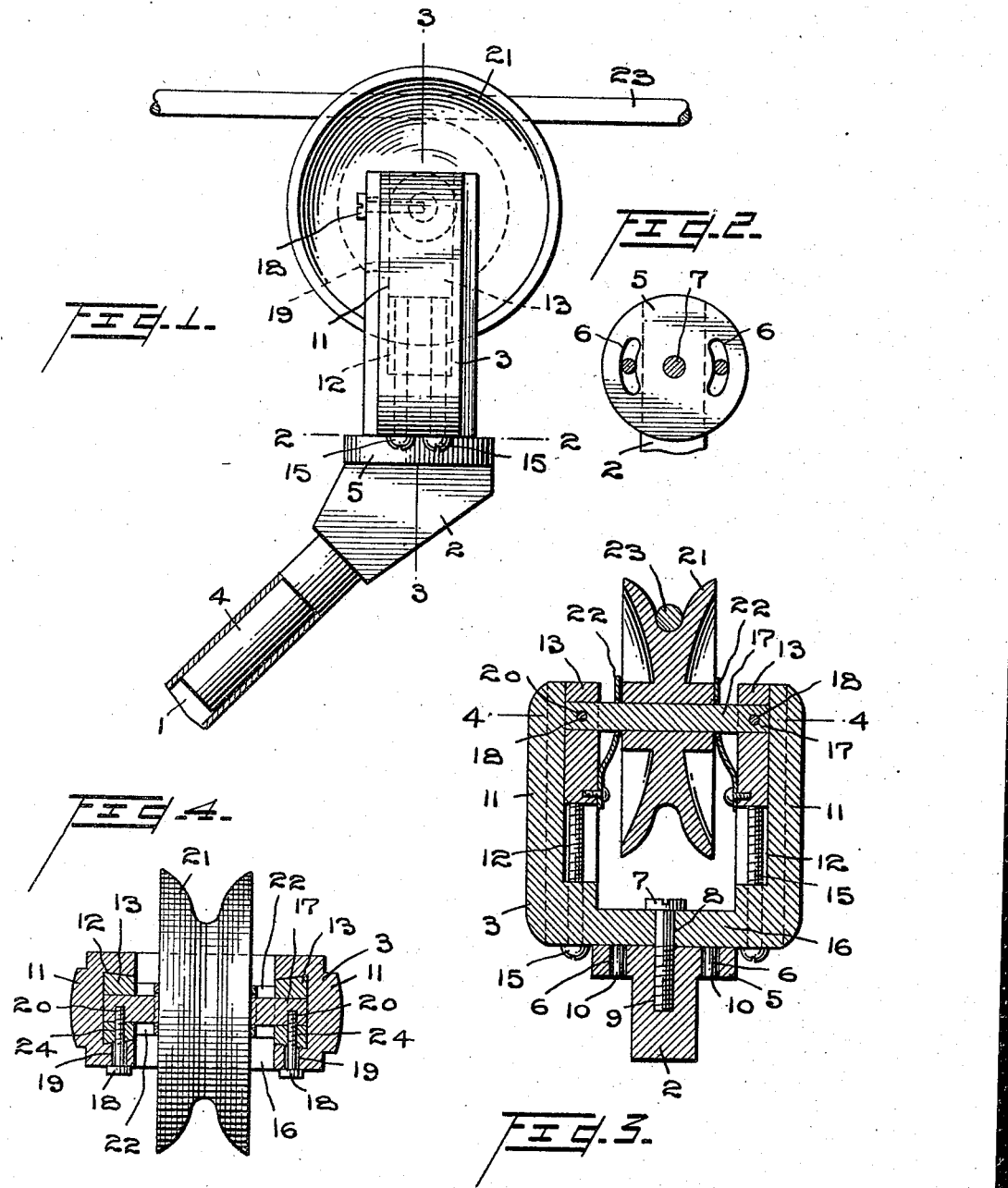

UNITED STATES PATENT OFFICE.

JOHN K. PARK, OF ATLANTIC CITY, NEW JERSEY.

TROLLEY-HARP.

1,185,130.  Specification of Letters Patent.  Patented May 30, 1916.

Application filed August 16, 1915. Serial No. 45,716.

*To all whom it may concern:*

Be it known that I, JOHN K. PARK, a citizen of the United States, residing at Atlantic City, in the county of Atlantic and State of New Jersey, have invented certain new and useful Improvements in Trolley-Harps, of which the following is a specification.

My invention relates to improvements in trolley harps, an object of the invention being to provide a harp in which the journal supporting blocks can be adjusted vertically so as to accommodate various sizes of trolley wheels.

A further object is to provide an improved construction of trolley harp which will be exceedingly strong to withstand the uses to which it is necessarily subjected, and provide improved mounting for the harp which permits it to turn within certain limits.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in horizontal section on the line 2—2 of Fig. 1. Fig. 3 is a view in section on the line 3—3 of Fig. 1, and Fig. 4 is a view in section on the line 4—4 of Fig. 3.

1 represents a tubular trolley pole, and 2 is a casting constituting the supporting base of my improved harp 3. The base 2 has a shank 4 which is secured within the trolley pole 1, and the upper end of said base is made with an integral circular platform 5 having concentrically curved slots 6 therein.

The harp 3 is pivotally connected to the base 2 by means of a screw 7 extended through a central opening 8 in the bottom of the harp, and screwed into a threaded recess 9 in the base.

Depending lugs 10 are fixed to the base and move in the slots 6, so that the harp is free to turn within the limits of the slots. The upright members 11, 11 of the harp are provided in their inner faces with dovetailed longitudinal grooves 12 to receive blocks 13, the latter corresponding in shape in cross section to the grooves, so that they slide in the grooves, but are held against lateral movement.

Vertically positioned screws 15 project through the base portion 16 of the harp, and into the grooves 12. The blocks 13 rest upon the upper ends of these screws and by adjusting the screws the blocks can be positioned at any desired vertical adjustment.

Blocks 13 support a journal pin 17, and screws 18 are projected through longitudinal slots 19 in the upright members 11 of the harp, and are projected through openings 24 in the blocks 13 and into recesses 20 in the journal pins, thereby holding the journal pins against rotary movement.

21 is a trolley wheel mounted to turn on journal pin 17 and spaced from the blocks by springs 22 secured at their ends to the blocks and at their free ends bearing against the hub of the trolley wheel. By the arrangement of blocks and supporting screws 15, the blocks can be positioned at an elevation and desired diameter of trolley wheel within certain limits can be employed.

After the parts are once adjusted, the screws 18 operate to effectually lock the parts against accidental movement. It will therefore be noted that with my improved harp I can construct the same relatively strong and can accommodate various sizes of wheel without changing the harp, thus allowing the use of the harp on various railroads in connection with any desired size of wheel.

Furthermore, my improved construction of harp permits the wheel to follow the varying positions of the trolley wire shown at 23 in Fig. 1, and is less liable to jump the wire than ordinary constructions in use.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a base having a platform at its upper end, with curved slots in the platform, of a trolley harp having upright fork members, said harp pivotally connected to the platform and having lugs thereon projecting into the slots, blocks adjustable vertically in the upright members of the harp, a journal pin secured in the blocks, and a trolley wheel on the journal pin, substantially as described.

2. A trolley harp comprising parallel upright members having grooves in their inner faces, blocks mounted in said grooves, screws projecting through the bottom of the harp and located against the lower ends of the blocks, and a trolley wheel supported by the blocks, substantially as described.

3. A trolley harp comprising parallel upright members having grooves in their inner faces, blocks mounted in said grooves, screws projecting through the bottom of the harp and located against the lower ends of the blocks, a journal pin supported in the blocks, said upright members of the harp having slots in their edges, screws projected through the slots and through the blocks engaging the journal pin, and a trolley wheel on said journal pin, substantially as described.

4. A trolley harp comprising parallel upright members having grooves in their inner faces, blocks mounted in said grooves, screws projecting through the bottom of the harp and located against the lower ends of the blocks, a journal pin supported in the blocks, said upright members of the harp having slots in their edges, screws projected through the slots and through the blocks engaging the journal pin, a trolley wheel on said journal pin, a support, a screw pivotally connecting the center of the base of the harp to said support, and means limiting the turning movement of the harp on the support, substantially as described.

In testimony whereof I have signed my name to this specification in the presence of two subscribing witnesses.

JOHN K. PARK.

Witnesses:
E. HARTNETT,
THOS. F. FREWERS.

Copies of this patent may be obtained for five cents each, by addressing the "Commissioner of Patents, Washington, D. C."